United States Patent
Kapulkin et al.

(10) Patent No.: US 9,229,702 B1
(45) Date of Patent: Jan. 5, 2016

(54) SYSTEMS AND METHODS FOR APPLICATION PLUGIN DEPLOYMENT FOR WEBSITES

(71) Applicant: Lithium Technologies, Inc., San Francisco, CA (US)

(72) Inventors: Yuri Kapulkin, San Francisco, CA (US); Douglas Schroeder, Pittsburg, CA (US); Chhama Jain, Emeryvile, CA (US); Venkatesh Subramanian, Dublin, CA (US); Jeffrey Yeldezian, Oakland, CA (US)

(73) Assignee: Lithium Technologies, Inc., San Francisco, CA (US)

( * ) Notice: Subject to any disclaimer, the term of this patent is extended or adjusted under 35 U.S.C. 154(b) by 108 days.

(21) Appl. No.: 14/012,978

(22) Filed: Aug. 28, 2013

(51) Int. Cl.
*G06F 9/44* (2006.01)
*G06F 9/445* (2006.01)

(52) U.S. Cl.
CPC .. *G06F 8/65* (2013.01); *G06F 8/70* (2013.01); *G06F 8/61* (2013.01); *G06F 9/44536* (2013.01)

(58) Field of Classification Search
CPC ............... Y10S 707/99939; Y10S 707/99954; G06F 8/65; G06F 8/60; G06F 8/71; G06F 9/44536
See application file for complete search history.

(56) References Cited

U.S. PATENT DOCUMENTS

| | | | | |
|---|---|---|---|---|
| 6,871,232 B2 * | 3/2005 | Curie | ..................... | G06Q 10/06 709/225 |
| 7,409,710 B1 * | 8/2008 | Uchil | ..................... | H04L 63/08 713/155 |
| 7,818,758 B2 * | 10/2010 | de Bonet | ................. | G06F 9/541 717/168 |
| 8,286,154 B2 * | 10/2012 | Kaakani | ............. | G05B 19/0426 717/168 |
| 8,505,069 B1 * | 8/2013 | Solodovnikov | ........... | G06F 8/65 709/224 |
| 8,752,041 B2 * | 6/2014 | Akiyoshi | .................. | G06F 8/60 717/174 |
| 2003/0078959 A1 * | 4/2003 | Yeung | ........................ | G06F 8/62 709/201 |
| 2005/0132348 A1 * | 6/2005 | Meulemans | .............. | G06F 8/65 717/168 |
| 2007/0282800 A1 * | 12/2007 | England | ................ | G06F 21/604 |
| 2009/0144723 A1 * | 6/2009 | Hartin | ....................... | G06F 8/65 717/173 |

(Continued)

OTHER PUBLICATIONS

M Hughes, Deploying Your Application, 2008, retrieved online on Sep. 24, 2015, pp. 131-151. Retrieved form the Internet: <URL: http://download.springer.com/static/pdf/981/chp%253A10. 1007%252F978-1-4302-0994-2_6.pdf>.*

(Continued)

*Primary Examiner* — Thuy Dao
*Assistant Examiner* — Hanh T Bui
(74) *Attorney, Agent, or Firm* — Morgan, Lewis & Bockius LLP

(57) ABSTRACT

The method manages customization upgrades to a production website while keeping it accessible. The website currently utilizes a first version of a software plugin. A user requests copying a second version of the plugin from another website to production, which is then authorized. Copying the plugin makes both versions simultaneously operational for distinct groups of users. Users request a webpage that utilizes the plugin, and receive the webpage customized by the first or second version of the plugin depending on whether they are preview-mode users. A request to designate the second version of the plugin as the live version is submitted, and authorization to implement the request is received. After designating the second version of the plugin as the live version, all subsequent requests for the webpage result in receiving the webpage customized by the second version of the plugin regardless of whether the users are designated as preview-mode users.

18 Claims, 11 Drawing Sheets

(56) References Cited

U.S. PATENT DOCUMENTS

2009/0158265 A1* 6/2009 Davis ................... G06F 8/65
717/168
2014/0047429 A1* 2/2014 Gaither ................. G06F 8/60
717/168

OTHER PUBLICATIONS

Klaus Marquardt, Patterns for Software Release Versioning, Jul. 2010, retrieved online on Sep. 24, 2015, pp. 1-13. Retrieved from the Internet:<URL: http://delivery.acm.org/10.1145/2330000/2328931/a17-marquardt.pdf?>.*

* cited by examiner

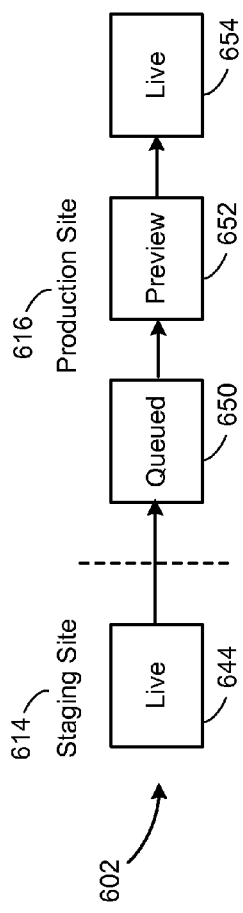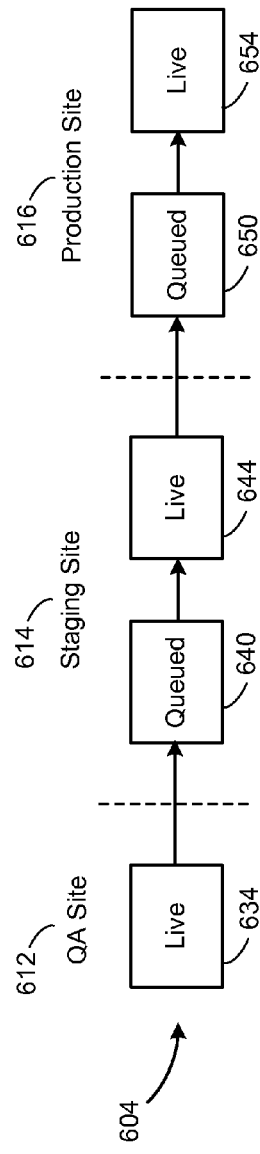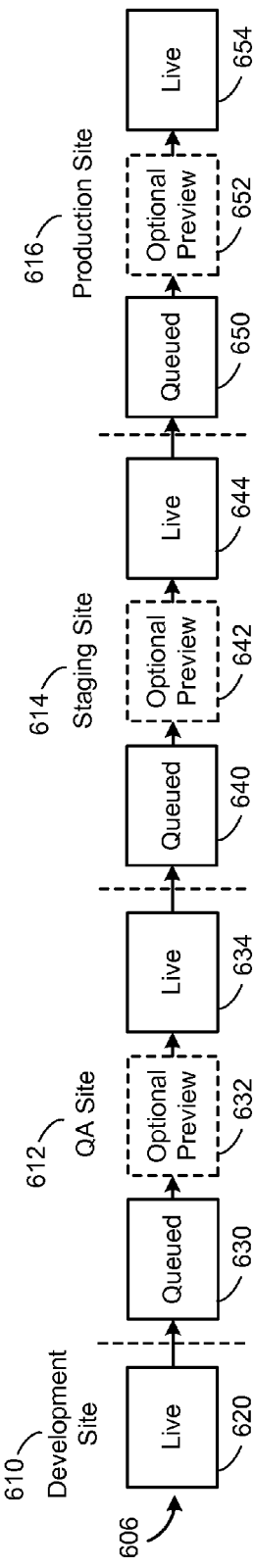

SYSTEMS AND METHODS FOR APPLICATION PLUGIN DEPLOYMENT FOR WEBSITES

TECHNICAL FIELD

The disclosed implementations relate generally to the deployment of website customizations, and more specifically to deployment of website customizations without taking the website out of service.

BACKGROUND

Some websites include a core platform that provides a set of plugin points that allow for customization. For example, the core platform may provide the infrastructure for an online community, and different business entities that utilize the core platform can customize their online community in unique ways. Each plugin point has a defined interface defined by the core platform and executes under specific conditions (e.g., custom search functionality that executes in response to clicking on a search icon, or just placing a custom business logo at a specific location on a webpage). By having defined plugin points, the core platform can be upgraded without breaking the customizations, and the customizations can be modified without changing the core platform.

Deploying new versions of custom software plugins creates some difficulties, particularly when the new versions are moved to a production environment that is accessed by many users (e.g., thousands). One problem is that releasing new versions typically requires locking users out during the upgrade. Because users may access a website at any time of day or night (particularly for websites that are accessed globally), taking a website down is a problem for users (and thus a problem for the business entity). Users expect a website to be available all the time.

Another problem is the administrative process of who has the authority to initiate an upgrade. For example, a new version may be complete from the standpoint of the developers, but a website administrator for the production website may not be ready for the upgrade. Yet another problem is how long to keep a website down while the new plugin version is tested in the new environment. Because two website environments are not identical, a plugin that appeared to be fine in one environment may not work correctly in another environment (e.g., a production website that enables access to users anywhere on the Internet is different from a QA website that may be limited to internal users).

In addition, even after deployment of a plugin, if a problem is detected, there may be no simple way to revert back to a previous version without bringing down the website again.

SUMMARY

Disclosed implementations of the present invention address these and other problems by providing a deployment flow and enabling multiple versions of the same software plugin to be active on the same website at the same time. Specifically designated administrative users can determine which versions are deployed at which websites and which versions of plugins are utilized for webpages for various groups of users.

According to some implementations, a method of managing customization upgrades to a production website while keeping the production website accessible to users is performed by one or more servers, each having one or more processors and memory. A request is received from a first user to copy a second version of a software plugin from a staging website to a production website. The production website currently utilizes a first version of the software plugin. Authorization is received from a second user to implement the first user's request, and subsequently the second version of the software plugin is copied to the production website. In some implementations, copying includes making new physical copies of the files for the software plugin at the production website. In other implementations, "copying" is performed by updating a status table to specify that the production website uses the new version. After copying, both the first and second versions of the software plugin are simultaneously operational for distinct groups of users of the production website.

According to some implementations, when a third user requests a webpage from the production website that utilizes the software plugin and the third user is designated as a preview mode user, the third user is provided the webpage customized by the second version of the software plugin. When a fourth user requests the webpage and is not designated as a preview mode user, the fourth user is provided the webpage customized by the first version of the software plugin.

According to some implementations, a request is received to designate the second version of the software plugin as the live version, and authorization is received to implement the designation. In accordance with the designation request, the second version of the software plugin is designated as the live version. Subsequently, when a user requests the webpage, the user is provided the webpage customized by the second version of the software plugin regardless of whether the user is designated as a preview mode user.

Some implementations apply the same process to non-production websites, or perform the process serially to a sequence of websites (e.g., copy and preview going from website A to website B, then copy and preview going from website B to website C). In some implementations, when a plugin is copied to multiple websites serially (e.g., A to B to C), the preview step is omitted from one or more (or all) of the stages. In some implementations, a software plugin consists of a single component, such as an executable program or script. In other implementations, a software plugin comprises a plurality of components (e.g., one or more executable components, together with other files, such as images or other objects typically used in web pages). In some implementations, the components of a software plugin are stored in a database (e.g., as blobs in a relational database). In some implementations, a software plugin is stored as files on a file server, typically in a hierarchical directory structure.

According to some implementations, after the second version of the software plugin has been designated as the live version, there is a need to revert to the prior version (e.g., a bug is discovered that was not detected earlier). A user (e.g., administrator) issues a request to rollback the second version of the software plugin. In accordance with the rollback request, the first version of the software plugin is designated as the live version. Once the first version of the software plugin is designated as the live version again, all subsequent requests for the webpage result in receiving the webpage customized by the first version of the software plugin regardless of whether the requesting user is designated as a preview mode user. The rollback to the prior version is performed while the website remains active (i.e., users are not locked out while performing the rollback).

BRIEF DESCRIPTION OF THE DRAWINGS

FIGS. 6A-6C illustrate the deployment progress of a software plugin in accordance with several implementations.

Like reference numerals refer to corresponding parts throughout the drawings.

DESCRIPTION OF IMPLEMENTATIONS

A "plugin" is generally a software component (or set of components) that connects into another software application. A plugin adds a new or different feature, such as a user interface customization, a calculation customization, a link to another software application, or other feature not provided by the base software application. The plugin points are defined by the base software application, including the interface for the plugins (e.g., what parameters are passed to an executable plugin or an abstract class definition that must be implemented by a plugin). A plugin may include multiple components, such as executable programs or scripts, HTML code, images, and so on.

Figure 1:
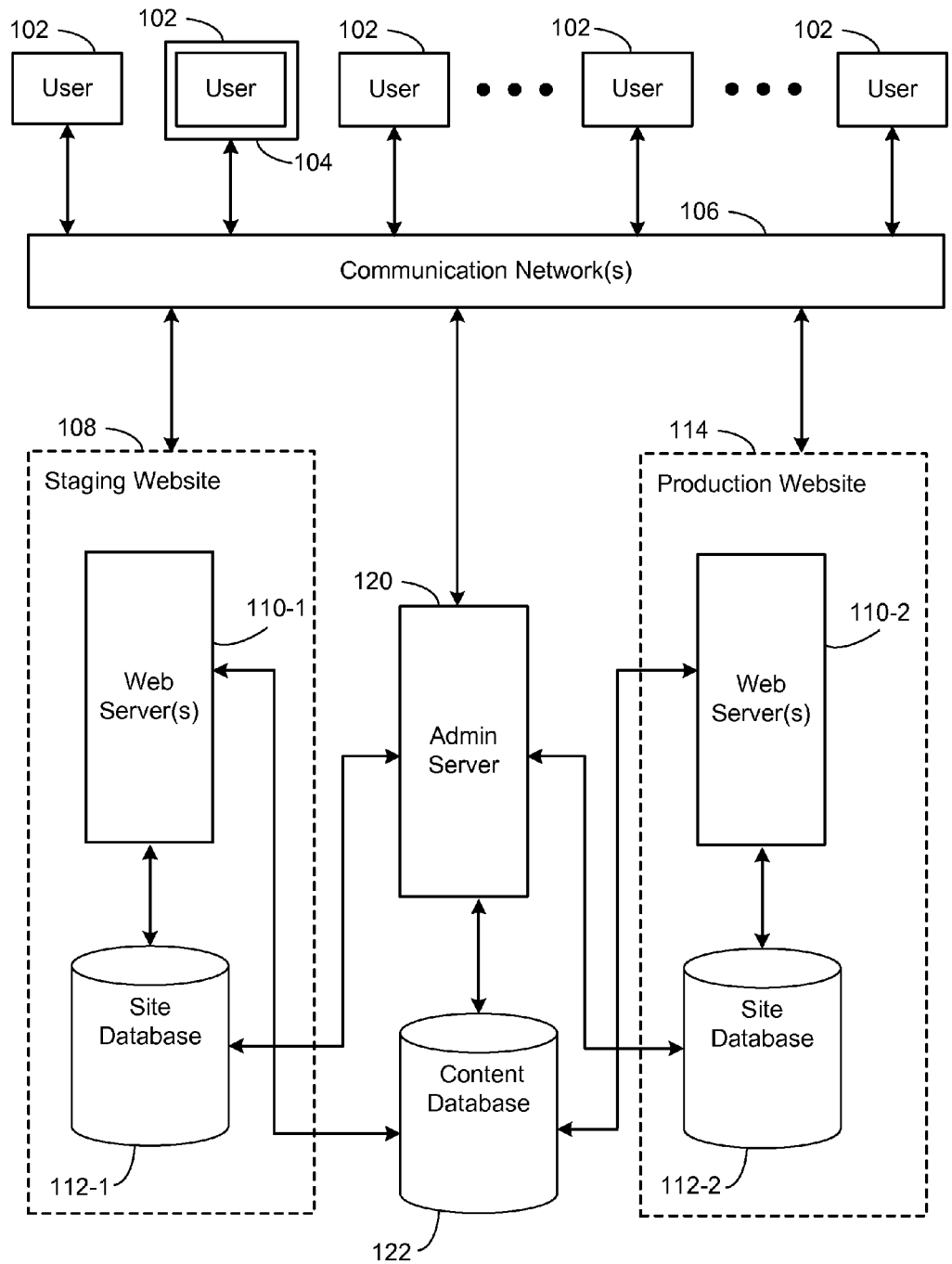
FIG. 1 illustrates the context in which some implementations of the present invention operate.

FIG. 1 illustrates the context in which some implementations of the present invention operate. As shown in this figure, there are two websites, the staging website 108 and the production website 114. The names "staging" and "production" should not be considered limiting because the processes described herein can be applied to any pair of websites where a plugin component is copied from one of the websites to the other. Consistent with typical development methodology, a plugin usually begins in a development environment, moves to a QA testing environment when it is deemed ready for testing, and potentially additional environments such as staging, user acceptance testing, or pre-production prior to ending in the production environment. The movement of plugins through these environments is illustrated below with respect to FIGS. 6A-6C.

As shown in FIG. 1, each of the websites 108 and 114 has one or more web servers 110 (e.g., web servers 110-1 and 110-2) that receive requests from users and provide webpages or other resources as requested. The web server 110 retrieves web pages and other information from a corresponding site database 112 (e.g., site databases 112-1 or 112-2). In addition, the web servers 110 access data from a content database 122, which stores data that may be rendered in the requested web pages. For example, in a website 108 or 114 for an online community, the content database 122 may store user postings to online forums, knowledge base articles, product reviews and recommendations, and so on. The same underlying content is accessed whether a user 102 is accessing the staging website 108 or the production website 114.

Figure 4:
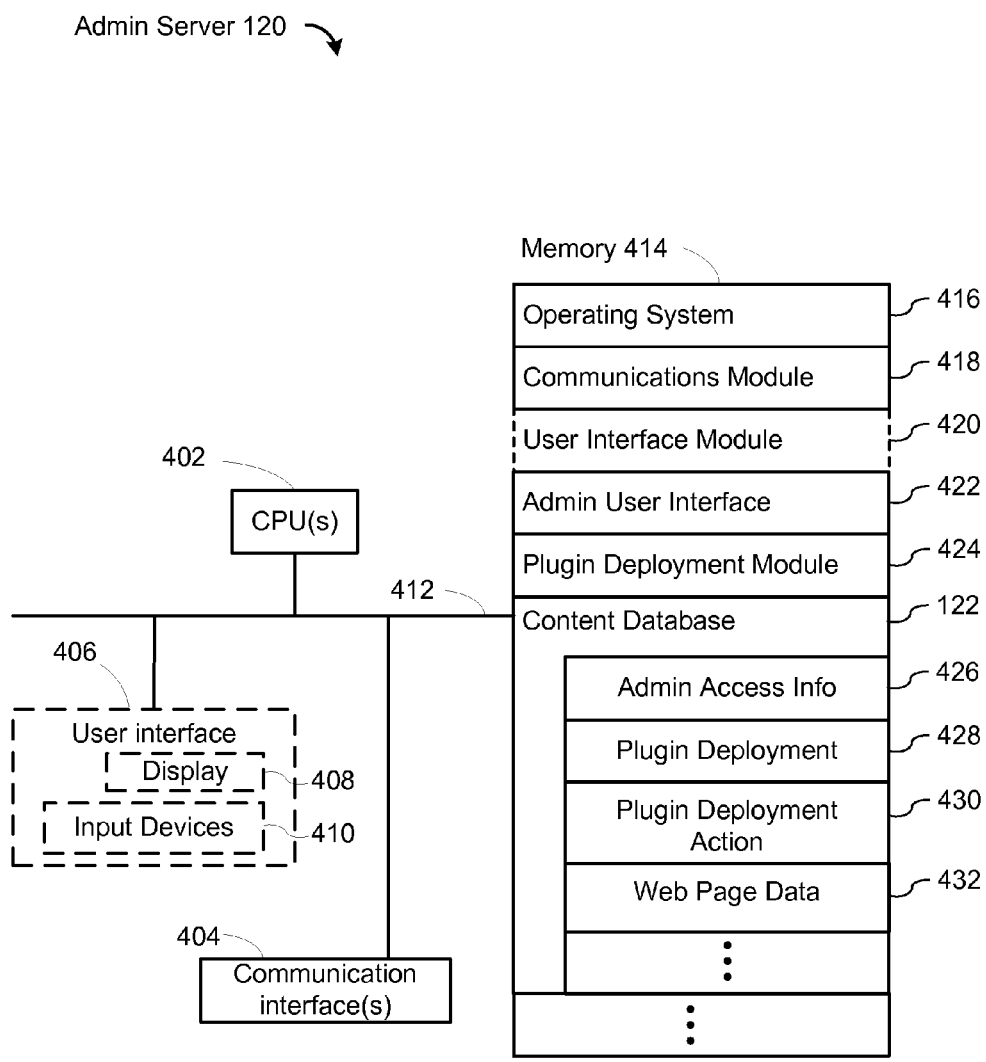
FIG. 4 is a block diagram illustrating an admin server in accordance with some implementations.
Figure 7A:
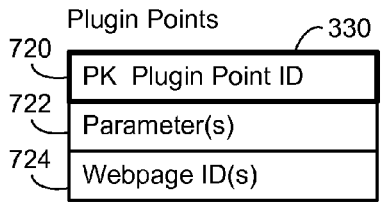
FIGS. 7A-7G illustrate sample data structures that are used for deploying software plugins in accordance with some implementations.

In some implementations, each website has its own content database 122. For example, the main content database 122 may be used by the production website 114. When testing is required, a copy of the database 122, or portions thereof, can be copied to a testing environment (such as staging website 108). In some implementations, the content database 122 also includes data structures that are used by the disclosed deployment processes, as indicated in FIGS. 4, 7E, and 7F.

Certain users 102 (e.g., "webmasters" or "admin users" 104) control the operation of each website, but not necessarily the content. For example, an ordinary user 102 can post a question or comment on an online forum. In some implementations, the admin users 104 access the data in the site database 112 and content database 122 directly from a corporate LAN. In some implementations, user accounts for the admin users 104 are stored in the content database 122 (e.g., when there is a single content database). A simplified data structure 426 for admin users is illustrated in FIG. 7G.

Many users 102 can access the production website 114, using one or more communications networks 106. In some cases, a user 102 must register at the production website 114 in order to access most of the content. In some implementations, an unregistered user has guest privileges, which provides access to some (or all) of the website. Some websites 114 allow unregistered users 102 to read the data on the website 114, but not post new questions or comments. Some of the users 102 are admin users 104 who can log into the admin server 120.

In general, a non-production website, such as the staging website 108 is inaccessible to most users. For example, a non-production website may be limited to users 102 inside a corporate firewall, and may be further limited by IP address, user ID, or other means.

Figure 2:
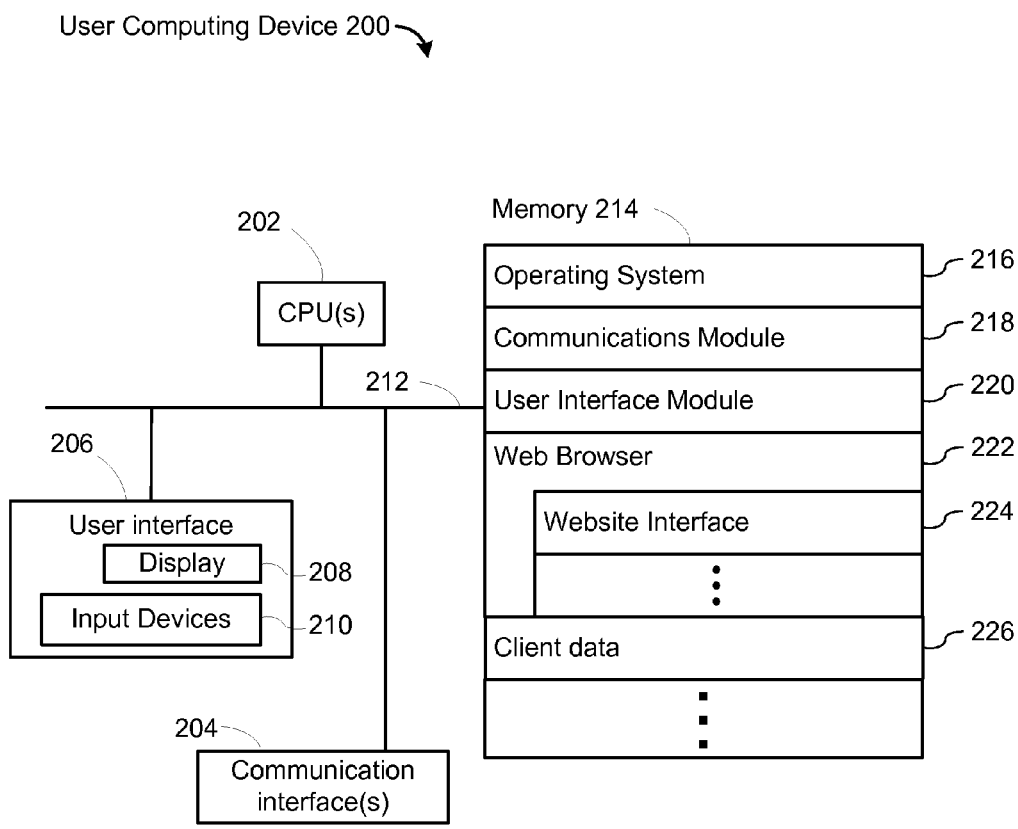
FIG. 2 is a block diagram illustrating a user computing device in accordance with some implementations.

FIG. 2 is a block diagram illustrating a user computing device 200, according to some implementations, which can connect a user 102 to a website, such as production website 114 through a communication network 106. The user computing device 200 can be a desktop computer, laptop computer, a tablet computer, a Smart Phone, or other mobile device that can connect to other computing devices over a communication network 106. The user device 200 typically includes one or more processing units or cores (CPUs) 202, one or more network or other communications interfaces 204, memory 214, and one or more communication buses 212 for interconnecting these components. The communication buses 212 may include circuitry (sometimes called a chipset) that interconnects and controls communications between system components. The user computing device 200 also includes a user interface 206 comprising a display device 208 and input devices 210 (e.g., keyboard, mouse, touch screen, keypads, microphones, cameras, etc.). The memory 214 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 214 may optionally include one or more storage devices remotely located from the CPUs 202. The memory 214, or alternately the non-volatile memory device(s) within the memory 214, comprises a computer readable storage medium. In some implementations, the memory 214 stores the following programs, modules and data structures, or a subset thereof:

- an operating system 216 that includes procedures for handling various basic system services and for performing hardware dependent tasks;
- a communication module 218 that is used for connecting the user computing device 200 to other computer systems via the one or more communication interfaces 204 (wired or wireless) and one or more communication networks 106, such as the Internet, other wide area networks, local area networks, metropolitan area networks, personal area networks, and so on;

a user interface module 220 that receives commands from the user via the input devices 210 and generates user interface objects in the display device 208;

a web browser 222 that enables a user to access resources, web pages, and web applications over a communication network;

a website interface 224, providing access to a production website 114; and client data 226, such as cookies or other data saved locally and used by the website interface 224.

Each of the above identified elements may be stored in one or more of the previously mentioned memory devices, and corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various implementations. In some implementations, the memory 214 may store a subset of the modules and data structures identified above. Furthermore, the memory 214 may store additional modules and data structures not described above.

Although FIG. 2 shows a user computing device 200, FIG. 2 is intended more as a functional description of the various features that may be present in a user device than as a structural schematic of the implementations described herein. In practice, and as recognized by those of ordinary skill in the art, items shown separately could be combined and some items could be separated.

Figure 3:
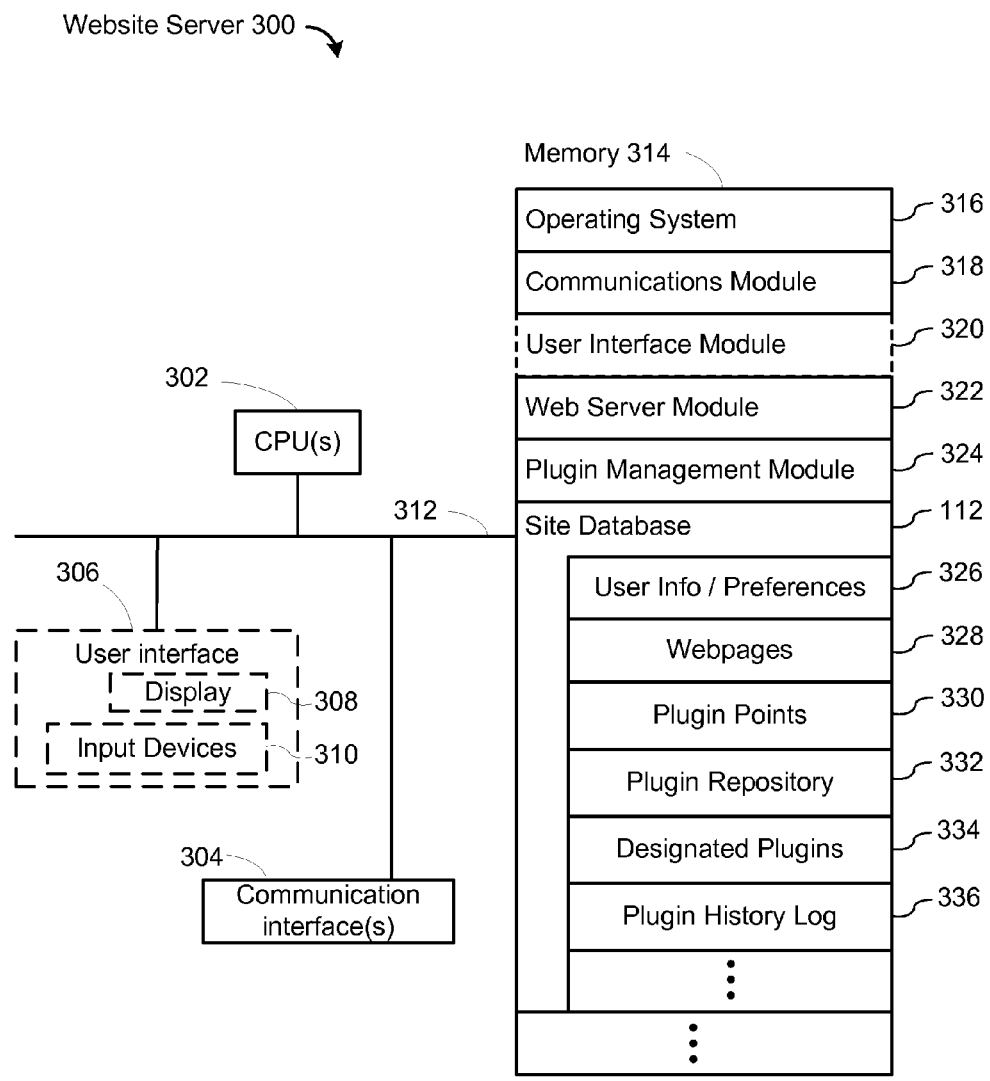
FIG. 3 is a block diagram illustrating a website server in accordance with some implementations.

FIG. 3 is a block diagram illustrating a website server 300, according to some implementations. A website server 300 typically includes one or more processing units or cores (CPUs) 302, one or more network or other communications interfaces 304, memory 314, and one or more communication buses 312 for interconnecting these components. The communication buses 312 may include circuitry (sometimes called a chipset) that interconnects and controls communications between system components. The website server 300 optionally includes a user interface 306 comprising a display device 308 and input devices 310 (e.g., keyboard, mouse, touch screen, keypads, microphones, cameras, etc.). The memory 314 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 314 optionally includes one or more storage devices remotely located from the CPUs 302. The memory 314, or alternately the non-volatile memory device(s) within the memory 314, comprises a computer readable storage medium. In some implementations, the memory 314 stores the following programs, modules, and data structures, or a subset thereof:

- an operating system 316, which includes procedures for handling various basic system services and for performing hardware dependent tasks;
- a communication module 318, which is used for connecting the website server 300 to other computers via the one or more communication interfaces 304 (wired or wireless) and one or more communication networks 106, such as the Internet, other wide area networks, local area networks, metropolitan area networks, and so on;
- an optional user interface module 320, which receives commands from the user via the input devices 310 and generates user interface objects in the display device 308;
- a web server module 322, which receives resource requests (e.g., HTTP requests) and returns web pages or other resources to the requestor. The web server module may run Apache Tomcat, Microsoft® Internet Information Server, or other similar software;
- a plugin management module 324, which may be invoked by the web server module 322 or individual webpages 328 to identify and call appropriate software plugins 734 at designated plugin points;
- one or more site databases 112, which store data for the website 108 or 114. The database 112 may include relational database(s), non-relational database(s), file server(s), and/or other storage means such as cloud storage. In some implementations, the databases 112 include both one or more relational databases as well as other non-relational storage, such as file server storage;
- the database 112 stores user information and preferences 326, such as user IDs and passwords, as well as configurable user preferences. In some implementations, one of the user preferences specifies whether a user is a preview mode user. For certain webpages 328, the web server 110 uses the preview mode parameter to determine which version of a software plugin to use when rendering the webpages;
- the database 112 stores webpages 328, including all associated files or components. Although some webpages 328 are static, many webpages 328 include dynamic content which is rendered at the time the webpage 328 is requested. For example, webpages 328 may include content from the content database 122. As known in the art, dynamic webpages 328 can be generated in many ways, including the use of scripting languages such as PHP, ASP, or JSP;
- in some implementations, the database 112 stores a specification of the plugin points 330 for the website. Although a plugin point is commonly tied to a single specific webpage 328, some plugin points 330 can be used by two or more distinct webpages 328. A skeleton data structure 330 for plugin points is illustrated in FIG. 7A. As used herein, a plugin point 330 is designed into a web page 328 (i.e., a plugin developer cannot "make up" a plugin point that is not already defined in the core website application);
- in some implementations, the database 112 includes a plugin repository 332, such as the one illustrated in FIG. 7B. A plugin repository 332 stores the actual plugins 734, together with identifying information. A plugin repository typically stores multiple versions of each plugin 734 as they are modified over time. In some implementations, plugin versions that have not been used are purged after a certain period of time (e.g., a year);
- the database 112 stores information that specifies which plugin versions are actively used at each website. Some implementations store this as a designated plugins table 334, such as the one illustrated in FIG. 7C. In some implementations, the designated plugins table 334 specifies the preview version 742 and the live version 744. The information in the designated plugins table 334 is generally updated by the plugin deployment module 424 as new versions of plugins are deployed. When a web page 328 is generated that includes a plugin, the appropriate version of the plugin is utilized based on the designated plugins table 334 as well as the information on whether the requesting user 102 is a preview mode user (e.g., as specified in the user info/preferences 326); in some implementations, the database 112 also stores a plugin history log 336, which provides a history of what plugin version were active at what time. A sample structure for the plugin history log is illustrated in FIG. 7D. In some implementations, this information is used when there is a request to rollback the current live version. The plugin history log 336 may also be consulted for debugging.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules and data structures not described above.

Although FIG. 3 shows a website server 300, FIG. 3 is intended more as a functional description of the various features that may be present in a set of servers than as a structural schematic of the implementations described herein. In practice, and as recognized by those of ordinary skill in the art, items shown separately could be combined and some items could be separated. In fact, FIG. 1 illustrates an implementation with at least two website servers 300 for each website 108 or 114 (one or more website servers 300 for the web servers 110 and one or more website servers 300 for the database 112). The actual number of website servers 300 used and how features are allocated among them will vary from one implementation to another, and may depend in part on the amount of data traffic that the system must handle during peak usage periods as well as during average usage periods.

FIG. 4 is a block diagram illustrating an admin server 120, according to some implementations. An admin server 120 typically includes one or more processing units or cores (CPUs) 402, one or more network or other communications interfaces 404, memory 414, and one or more communication buses 412 for interconnecting these components. The communication buses 412 may include circuitry (sometimes called a chipset) that interconnects and controls communications between system components. The admin server 120 optionally includes a user interface 406 comprising a display device 408 and input devices 410 (e.g., keyboard, mouse, touch screen, keypads, microphones, cameras, etc.). The memory 414 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 414 optionally includes one or more storage devices remotely located from the CPUs 402. The memory 414, or alternately the non-volatile memory device(s) within the memory 414, comprises a computer readable storage medium. In some implementations, the memory 414 stores the following programs, modules, and data structures, or a subset thereof:

- an operating system 416, which includes procedures for handling various basic system services and for performing hardware dependent tasks;
- a communication module 418, which is used for connecting the admin server 120 to other computers via the one or more communication interfaces 404 (wired or wireless) and one or more communication networks 106, such as the Internet, other wide area networks, local area networks, metropolitan area networks, and so on;
- an optional user interface module 420, which receives commands from the user via the input devices 410 and generates user interface objects in the display device 408;
- an admin user interface 422, which may be used by a user directly using the user interface hardware 406 (e.g., a user sitting next to the admin server 120 using devices 408 and 410 connected directly to the admin server) or remotely over the communication network 106 (e.g., a web-based interface);
- a plugin deployment module 424, as described in more detail below with respect to FIGS. 5, 6, and 8A-8D;
- one or more content databases 122, which store data for the website 108 or 114. The database 122 may include relational database(s), non-relational database(s), file server(s), and/or other storage means such as cloud storage. In some implementations, the databases 122 include both one or more relational databases as well as other non-relational storage, such as file server storage;
- the database 122 stores admin access information 426, such as user IDs and passwords, as well as a set of access privileges 794. A sample structure for storing admin access information 426 is illustrated in FIG. 7G;
- the database 122 stores a plugin deployment table 428, which manages the deployment of a plugin through a sequence of action steps. In some implementations, the action steps for a deployment are stored in a plugin deployment action table 430. Sample tables for managing plugin deployment are illustrated in FIGS. 7E and 7F;
- the database 122 also stores web page data 432, which includes any dynamic data that is included in the web pages. For example, when a website 108 or 114 is an online community for a business entity, the web page data may include user postings at community forums, blog postings by subject matter experts, a listing of products provided by the business and recommendations for those products, knowledge base articles, and so on.

Each of the above identified elements may be stored in one or more of the previously mentioned memory devices, and corresponds to a set of instructions for performing a function described above. The set of instructions can be executed by one or more processors (e.g., the CPUs 402). The above identified modules or programs (i.e., sets of instructions) need not be implemented as separate software programs, procedures, or modules, and thus various subsets of these modules may be combined or otherwise re-arranged in various implementations. In some implementations, the memory 414 stores a subset of the modules and data structures identified above. Furthermore, the memory 414 may store additional modules and data structures not described above.

Although FIG. 4 shows an admin server 120, FIG. 4 is intended more as a functional description of the various features that may be present in a set of servers than as a structural schematic of the implementations described herein. In practice, and as recognized by those of ordinary skill in the art, items shown separately could be combined and some items could be separated. In addition, items shown separately in the website server in FIG. 3 and the admin server in FIG. 4 could be combined. For example, some implementations utilize a single database that combines the information illustrated in databases 112 and 122.

Each of the methods described herein may be implemented by instructions that are stored in a computer readable storage medium and that are executed by one or more processors of the website servers 300, admin servers 120, or user computing devices 200. Each of the functional operations shown in FIG. 2, 3, or 4, or in the figures below may correspond to instructions stored in a computer memory or computer readable storage medium.

Figure 5:
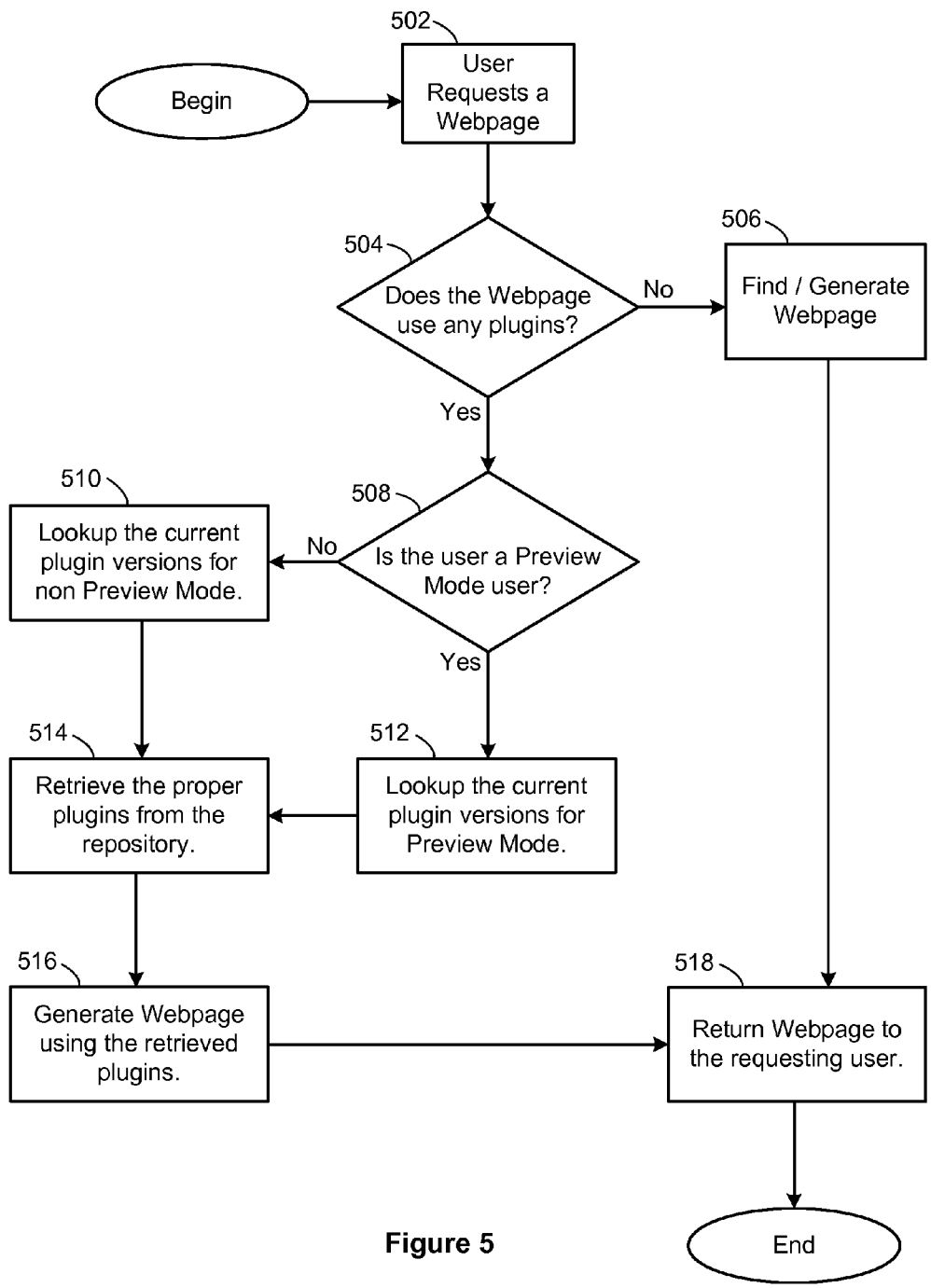
FIG. 5 is a flowchart for rendering a webpage in accordance with some implementations.

FIG. 5 is a flowchart for rendering a webpage 328 in accordance with some implementations. When a user 102 requests (502) a webpage 328 from a website 114, the web server 110 first determines (504) whether the web page 328 uses any plugins 734. In some implementations, this is a two step question: does the webpage 328 have any plugin points and, if so, are there plugins associated with those plugin points? In the absence of plugin points or the absence of plugins for those plugin points, the web server 110 finds (506) or generates (506) the requested web page 328 based on the standard non-customized process, and returns (518) the webpage 328 to the requesting user 102.

If the webpage 328 does use one or more plugins 734, the web server determines (508) whether the user 102 is a preview mode user. In some implementations, whether a user 102 is a preview mode user is a configurable parameter for each user. In some implementations, users are assumed to be non-preview-mode users unless their user IDs are on a designated list of preview mode users. Typically the number of preview mode users is small (e.g., less than 10 or less than 1% of the total) compared to the number of potential users 102 of the website 114 (e.g., thousands).

For a preview mode user, the web server 110 looks up (512) the current plugin versions for preview mode; for all other users, the web server 110 looks up (510) the current plugin versions for non preview mode users. Based on the identified plugin versions, the web server retrieves (514) the proper plugins from the repository 332. The web server 110 then generates (516) the webpage 328 using the retrieved plugins and returns (518) the webpage 328 to the requesting user 102.

Alternative implementations have a slightly different process flow. For example, some implementations locate the plugins in a file server directory structure. In some of these implementations, each plugin point has a unique directory, and each plugin directory includes a subdirectory for the "live" version and a subdirectory for the "preview" version. In some of these implementations, there is a default "do nothing" plugin for each subdirectory. In some embodiments, the web server 110 always looks up whether a user 102 is a preview mode user, and always executes the appropriate plugin for each plugin point. When there is no actual customization, either a default plugin is executed (doing nothing) or else the core platform code detects that there is no plugin in the designated directory and does nothing.

FIGS. 6A-6C illustrate the deployment progress of a software plugin in accordance with several implementations. In the implementation illustrated in FIG. 6A, a plugin 734 is live 644 at a staging site 614 at the beginning of a deployment process 602. A first user 104 begins the deployment process 602 for the plugin 734, and the request is queued 650 at the production site 616. Subsequently, another user 104 (which may be the same as the first user 104 or a different user, depending on access privileges) authorizes the deployment. Based on the authorization, the plugin 734 is copied to the production site 616, and is initially in preview mode 652 for a limited set of users 102. In some implementations, copying of the plugin entails physical copying of one or more plugin components to the production site (e.g., to site database 112). In some implementations, copying of the plugin entails updating a table (such as designated plugins table 334 illustrated in FIG. 7C) to identify the appropriate plugin in a plugin repository (such as the plugin repository table 332 illustrated in FIG. 7B), and may not require physical copying of plugin components to another location. In some implementations, copying a plugin entails both physical copying of plugin components as well as updating a table.

In some circumstances, after a deployment request is queued, the request is subsequently denied, and the deployment does not occur. In some circumstances, deployment is authorized, but the deployment process 602 fails. One of skill in the art recognizes that there are many ways that the process could fail, such as hardware, software, network infrastructure, memory corruption, and so on. In some implementations, when a failure occurs, the deployment process 602 instance is terminated. To deploy the plugin, another new request must be submitted to queue 650 the plugin deployment. In some implementations, a deployment that has failed can be retried (either automatically or manually), typically after resolution of the problem that caused the failure.

While in preview mode 652, a user 104 requests that the plugin 734 be moved to live status 654 for everyone. The plugin 734 remains in preview status until another person 104 takes action on the "go-live" request. In general, the go-live request is eventually accepted. In some implementations, switching to live 654 entails setting a flag in a table, such as the "live version" field in the designated plugins table 334. In some implementations, switching to live 654 entails physically copying plugin components to another location (e.g., from a "preview" subdirectory to a "live" subdirectory in a hierarchical file system).

In some instances, there is a failure between preview 652 and live 654. In some implementations, when there is a failure, the move to live status is retried automatically or manually, typically after resolution of the problem that caused the failure. In some implementations, if retries are not successful within a certain period of time (e.g., an hour or two hours), or not successful within a certain number of tries (e.g., 5 tries or ten tries), the process 602 is aborted. In some implementations, the plugin 734 remains in preview mode 652. In some implementations, an admin user 104 can choose to keep the plugin 734 in preview mode 652 or roll back the entire process 602, which would typically result in making the currently live version also the preview mode version.

As noted above with respect to moving a plugin into preview mode, an admin user can choose to deny the request for moving to live mode 654. In some implementations, the deployment software takes a specific action when this occurs, but some implementations allow the user 104 to select what happens. For example, the whole deployment process 602 could be rolled back, removing the plugin even from preview mode 652; the plugin could remain in preview mode, pending a future request for promotion to live 654; or the denial could be temporary (e.g., promote to live 654 in 24 hours).

FIG. 6B illustrates a deployment process 604 that spans three sites, beginning in QA 612, moving to staging 614, and finally to production 616. In this deployment process 604, there is no preview mode because there is effectively a "preview" at the staging site 614. The staging site 614 gives designated users an opportunity to review the website (as customized by the plugin) prior to moving to the production website 616.

As noted above with respect to FIG. 6A, failures can occur at any step, and requests can be denied. Assuming there are no failures (or the failures are resolved) and the requests are accepted, the plugin proceeds from live 634 at the QA site 612 to queued 640 at the staging site 614, then live 644 at the staging site after receiving authorization. Later, the deployment is queued 650 in production 616, and finally moved to live 654 in production after receiving approval. Each operation (queuing or moving to live) is submitted or authorized by an admin user 104 with appropriate access privileges. In some instances, all of the operations are submitted or authorized by distinct admin users 104, but they are not required to be distinct. In some instances, two or more of the operations can be submitted or authorized by the same admin user 104.

Note that in FIG. 6B, the queuing operations are prior to going live, whereas the queuing operations in FIG. 6A are prior to going into preview mode.

FIG. 6C illustrates that a deployment process 606 can occur as an even longer sequence of operations at more sites, and there may or may not be a preview step at each site. In some implementations, when a deployment process 606 is initiated, the entire sequence of operations is determined, including the preview steps (if used). In some implementations, the admin user 104 determines whether there will be a preview step for that site (e.g., preview operations 632, 642, or 652). In these implementations, a "queued" operation, such as operations 630, 640, and 650, is a request to move to the site, but the admin user accepting the request determines whether the plugin goes directly to live status or to a preview status first. For example, the admin users for the QA site 612 and staging site 614 could choose to omit the preview operations 632 and 642, going directly to the live status 634 and 644. Even with omitted preview steps in QA and staging, an admin user 104 for the production site 616 might choose to use the preview mode 652 prior to going live 654 for all users.

In FIG. 6C, the deployment process 610 proceeds from the development site 610 through QA 612, staging 614, and eventually arriving in production 616. (Of course failures could prevent or delay the process 606.) In some implementations, each movement from one site to the next is considered a "deployment," and movement on to more sites is a separate deployment. In these implementations, FIG. 6C illustrates three distinct deployments. Some implementations support both methods. For example, an admin user 104 for the development site may only work with development and QA, and thus initiates deployment from development 610 to QA 612, without planning for the subsequent deployment. On the other hand, the entire process can be initiated at one time, recognizing that the plugin will ultimately go to production. In some instances, the selected methodology can depend on the estimated likelihood of rework. For example, a plugin version moved to QA may have a high probability of being returned to development for bug fixes, and thus planning deployment all the way from development 610 to production 616 may be unrealistic. In some implementations, a single level deployment (e.g., development to QA) may be subsequently extended to deploy further (e.g., QA to staging). Even in implementations where extensions are allowed, some admin users 104 can choose to initiate a "new" deployment when a plugin is later moved to another website.

FIGS. 7A-7G illustrate sample data structures that are used for deploying software plugins in accordance with some implementations. These skeletal data structures identify some of the critical fields, but actual implementations include many other fields. These data structures are presented in a format suitable for a relational database, with the primary key fields designated by the prefix "PK" and enclosed in a darker rectangle.

FIG. 7A identifies the plugin points 330. Each plugin point has a unique ID 720, which can be specified as a name, number, or other unique identifier. In some instances, the core platform code calls an executable plugin component for each plugin point, and may pass parameters 722 to the plugin 734. The plugin point specification 330 identifies the parameters, including the data type for each parameter, as well as the order of the parameters. This is sometimes referred to as the signature of the plugin. Note that the parameters can provide input to the plugin, receive output from the plugin, or both. Some implementations do not permit parameters.

Each plugin point corresponds to one or more webpages identified by webpage ID(s) 724. In many instances, a plugin point is associated with a single point in a single webpage. However, a single plugin point may be associated with multiple webpages, or multiple locations within a single webpage.

In some implementations, for each plugin point there is a corresponding file directory, and the components of a plugin are placed in the directory (or separate subdirectories for preview and live modes).

Figure 7B:
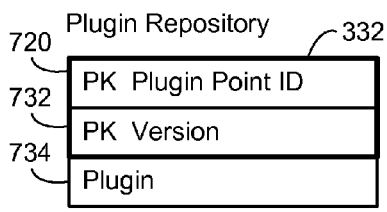

A plugin repository 332, as illustrated in FIG. 7B, stores the versions of each plugin. In some implementations, a plugin 734 is identified by the combination of the plugin point ID 720 and a version 732. Typically, version numbers are numeric and monotonically increasing. The plugin repository 332 also stores the physical components of the plugin 734. In some instances, a plugin comprises a single component, but in other instances, a plugin 734 comprises two or more components. Typically, at least one of the plugin components is an executable program, method, procedure, or script. In some implementations, the actual plugin components of a plugin are stored in a file server directory, and the plugin repository includes a link or location identifier for the plugin components.

Figure 7C:
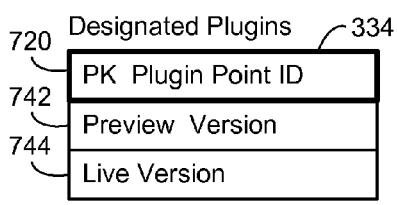
Figure 7D:
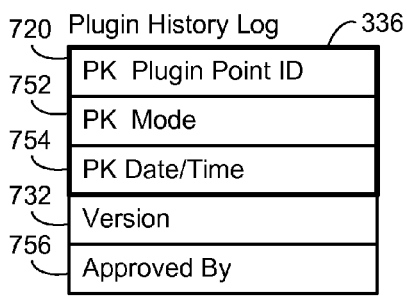
Figure 7E:
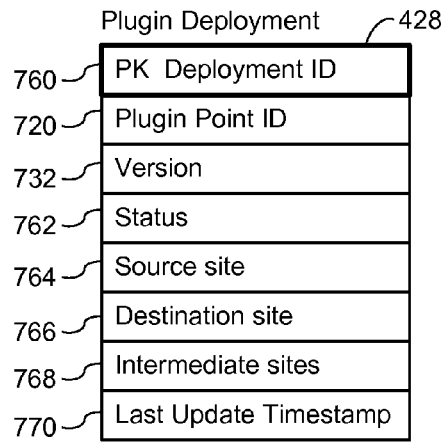
Figure 7F:
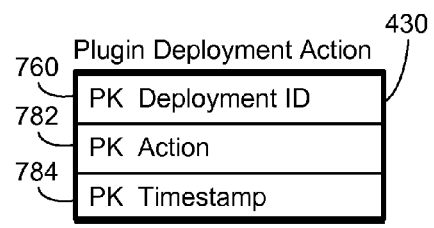
Figure 7G:
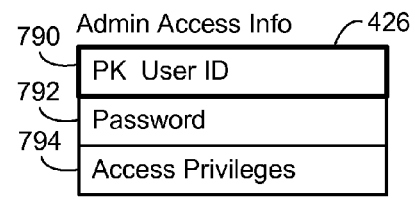
Figure 8A:
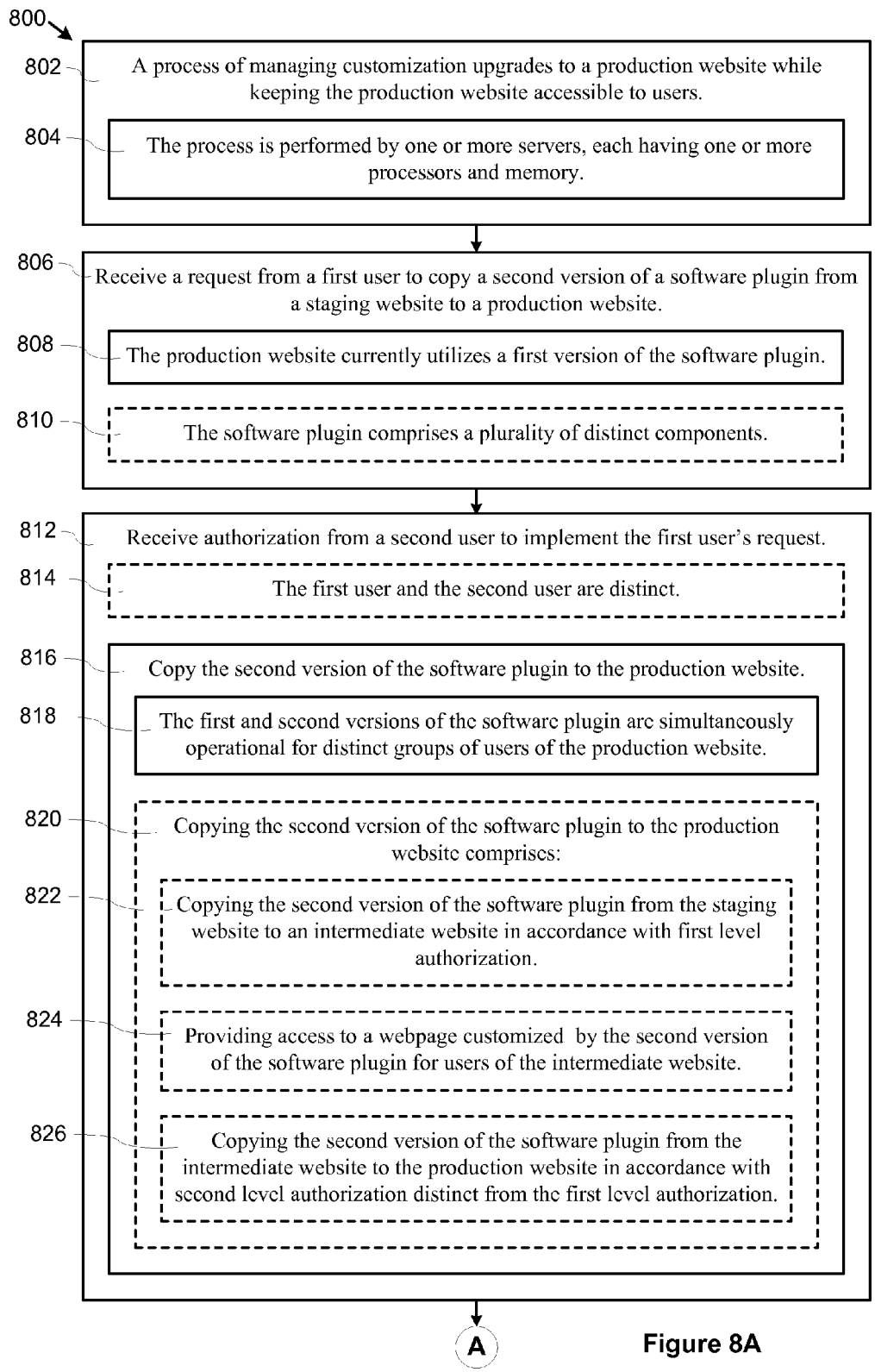
FIGS. 8A-8D illustrate a process flow for managing customization upgrades to a website in accordance with some implementations.
Figure 8B:
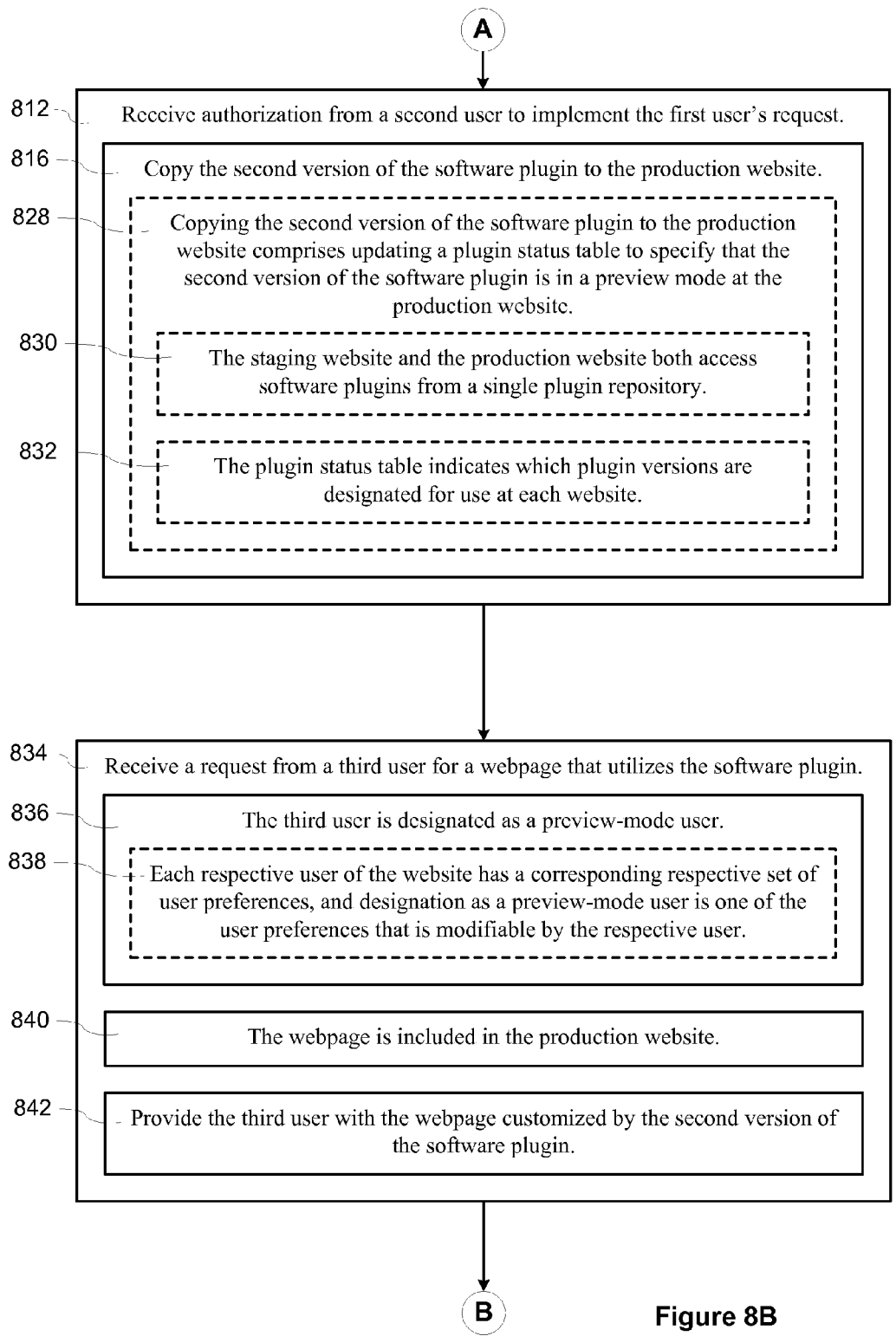
Figure 8C:
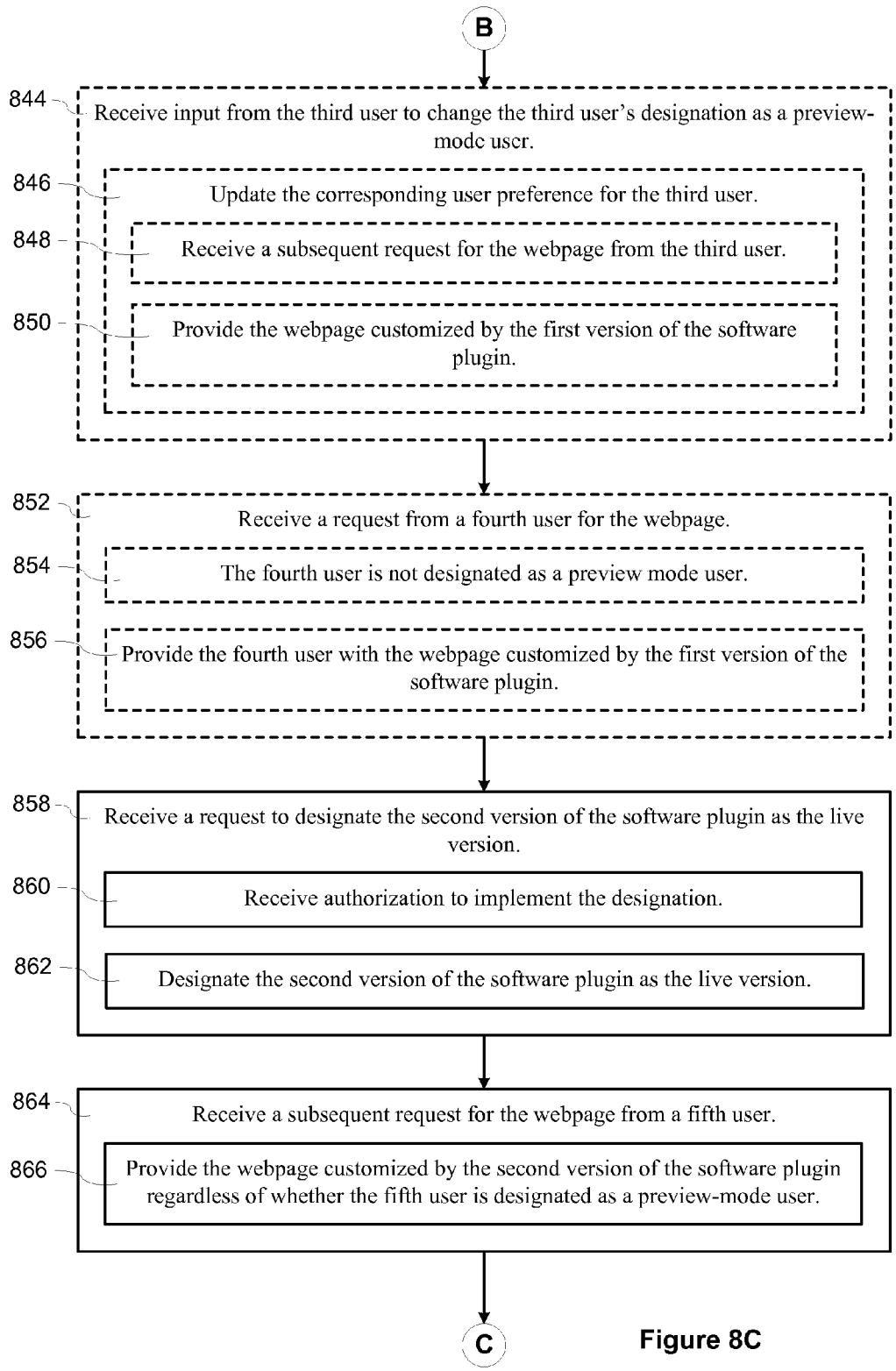
Figure 8D:
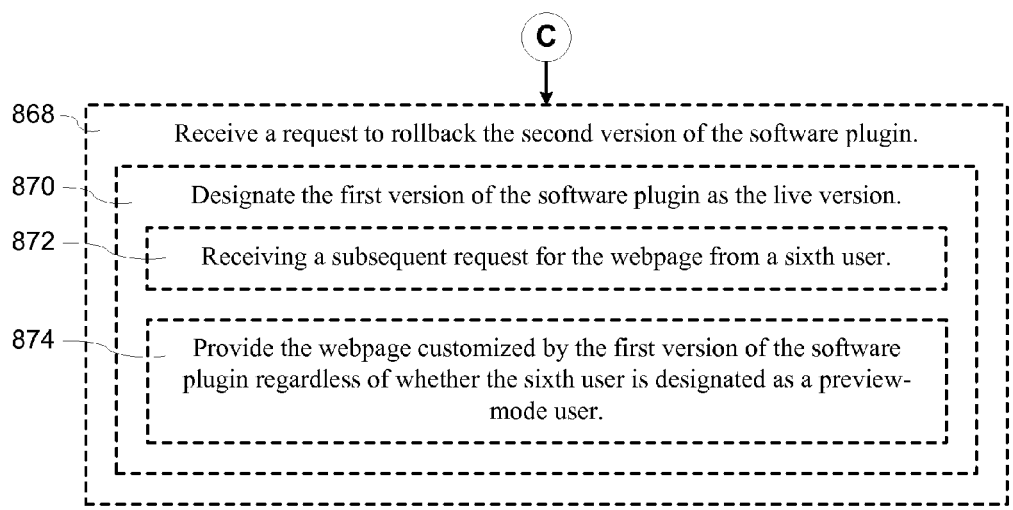

For each site, a designated plugins table 334 indicates what versions of a plugin are active at that site. In FIG. 7C, the designated plugins table 334 includes both a preview version 742 and a live version 744. When a user accesses a webpage that uses a plugin, the corresponding version is selected based on whether the user 102 is a preview mode user or not. Some implementations extend the structure in FIG. 7C to provide for more than two distinct simultaneous versions (e.g., a live version 744, a version for a beta testing group, and a version for an alpha testing group). In some implementations, the designated plugins table 334 is stored in a common database, such as content database 122, and stores the current versions used by two or more sites. In this case, a website ID or website designator is added to the primary key, and each row provides information for a single site.

A plugin history log 336 in FIG. 7D provides historical information on when plugins were active at a site. In some implementations, the primary key is the combination of the plugin point ID 720, the mode 752 (e.g., "preview" or "live"), and a date/time stamp 754 indicating when the plugin 734 became active for that plugin point ID and mode. In some implementations, the plugin history log 336 also includes a separate time stamp to indicate when a version is no longer active (e.g., "end date/time" or "expiration date/time"). The version field 732 specifies which version is (or was) active. In some implementations, the plugin history log 336 includes the name or user ID of the admin user 104 who approved the deployment step. Some implementations also identify the admin user who submitted the request and/or comments provided by the requestor or the approver.

The submission and approval of requests to copy plugins from one website to another is limited to specific authorized admin users 104. Some implementations include an admin access table 426 that identifies the admin users 104 as well as their access privileges 794 (e.g., who can submit requests for each website, who can authorize copying to preview mode, who can authorize copying a plugin to live mode, etc.). As illustrated in the sample data structure of FIG. 7G, the admin access table 426 includes both a user ID 790 and a password 792. The password is typically stored in an encrypted form. One of skill in the art recognizes that there are many ways to authenticate a user securely, many of which use more complex data structures.

FIGS. 7E and 7F illustrate skeletal data structures that some implementations use for each plugin deployment. In the illustrated implementation, each deployment has a corresponding record in the plugin deployment table 428 with a unique deployment ID 760. Typically a deployment involves only a single plugin 734, which is specified by the plugin point ID 720 and version 732. Some implementations extend the plugin deployment structure 428 to support deployment of multiple plugins as a group, and the plugins proceed together (e.g., where a feature requires customization at multiple plugin points, and thus the plugins to implement the feature must be deployed together).

Each deployment has a source site 764 and a destination site 766. In some implementations, there can be one or more intermediate sites 768 between the source site and the destination site in the deployment process. As noted above, some implementations define a deployment as just copying a plugin from a source site 764 to a destination site 766 without any intermediate sites. For example, the process 606 illustrated in FIG. 6C may be implemented as three separate deployments. In these implementations, there would be a separate record in the plugin deployment table 428 for each of the individual deployments.

In some implementations, there is a last update timestamp 770 that indicates the date and time of the last event for the deployment. Typically, each event corresponds to an action in the plugin deployment action table 430, and includes a change to the status field 762. Some implementations omit the status field 762 because the status is essentially specified by the last action record in the plugin deployment action table 430. In some implementations, the values for the status field include preview.queued, preview.accepted, go_live.queued, and go_live.accepted. Some implementations include status values of preview.canceled, preview.failed, go_live.canceled, and go_live.failed as well. For those implementations that support intermediate sites in a deployment, the status field may also specify the site where the action occurs. For example, a status of staging.preview.queued indicates that the plugin has been queued for preview at the staging website. For implementations where preview mode is optional and selected during deployment, a status value of "queued" may be used to indicate that it can be followed by preview.accepted or go_live.accepted.

Implementations that support rollback include status values to indicate the rollback, such as go_live.rolled_back or just rollback. In some implementations, the status values include deployment.completed, deployment.canceled, deployment.failed, and deployment.rolled_back. These status values may be used when it is appropriate to indicate the status of the entire process instead of just the most recent action.

FIG. 7F illustrates a table 430 of steps or actions that occur in a deployment process in accordance with some implementations. Each action involves inserting a new record into the plugin deployment action table 430. In some implementations, the values for the action field 782 correspond to the status values previously identified. One of skill in the art recognizes that many different sets of action or status values may be used, as long as they are used consistently and are preferably descriptive. In the illustrated plugin deployment action table 430, the timestamp specifies when the action occurred. The timestamp is part of the primary key here because an action can be repeated if it failed or was canceled earlier.

In this sample data structure 430, the action information is encoded as a single field 782. Some implementations utilize several distinct fields that convey the same information as the single illustrated action field 782. For example, some implementations use "site," "mode," and "activity." In this case, instead of "production.go_live.accept" as an action value, it would be stored as site="production," mode="live," and activity="accept."

FIGS. 8A-8D illustrate a process flow for managing customization upgrades to a website in accordance with some implementations. The process 800 manages (802) customization upgrades to a production website 114 while keeping the production website 114 accessible to users 102. The customizations are implemented as software plugins 734 corresponding to predefined plugin points. The process 800 is performed (804) by a plugin deployment module 424 on one or more servers 120, each having one or more processors 402 and memory 414, as illustrated above with respect to FIG. 4.

The deployment module 424 receives (806) a request from a first admin user 104 to copy a second version of a software plugin 734 from a staging website 108 to a production website 114. The production website 114 currently utilizes (808) a first version of the software plugin 734. Generally, the second version is newer, and provides features or fixes not in the first version. In some instances, the plugin 734 comprises a single component, which is generally executable (e.g., a script). Some implementations support plugins 734 that comprise (810) multiple components (e.g., one or more executable components as well as ancillary visual components such as icons or graphics).

Later, the deployment module receives (812) authorization from a second admin user 104 to implement the first admin user's request. Typically, the first admin user 104 and the second admin user 104 are (814) distinct, but most implementations do not require that they be distinct. The roles of the admin users 104 are configurable, so appropriate people can be assigned to various roles according to their responsibility within an organization (e.g., the webmaster for the production website 114 decides when to accept a new plugin version into production, but a different person from a staging or QA website 108 knows when to queue a plugin for production based on completion of their testing).

After receiving authorization from the second user 104, the deployment module 424 copies (816) the second version of the software plugin to the production website 114. Rather than overwriting the first version of the plugin, the second version exists separately from the first version, and the first and second versions of the software plugin are (818) simultaneously operational for distinct groups of users of the production website 114. In some implementations, there are two distinct groups of users, consisting of those designated as preview mode users and those who are not designated as preview mode users. In some implementations, there are more than two distinct groups (e.g., a main group that views only webpages customized by live versions of plugins, and two or more distinct preview mode groups who are performing final testing of different plugins).

In some instances, copying a plugin from the staging site 108 to the production site 114 involves an intermediate website between staging and production. In some implementations, this comprises (820) several steps. The deployment module 424 first copies (822) the second version of the software plugin 734 from the staging website 108 to an intermediate website in accordance with first level authorization. The intermediate website provides (824) access to a webpage 328 customized by the second version of the software plugin 734 for users of the intermediate website. Later (e.g., after sufficient testing at the intermediate website), the deployment module 424 copies (826) the second version of the software plugin 734 from the intermediate website to the production website 114 in accordance with second level authorization distinct from the first level authorization.

In some implementations, copying the second version of the software plugin 734 to the production website 114 comprises (828) updating a plugin status table (e.g., designated plugins table 334) to specify that the second version of the software plugin 734 is in preview mode at the production website 114. In some implementations that update a plugin status table, the "copying" operation does not entail physical copying of plugin components (e.g., the components are stored in a database, so each website just needs to know which version to retrieve). In some implementations, the staging website 108 and the production website 114 both access (830) software plugins 734 from a single plugin repository (e.g., plugin repository 332). In some implementations, the plugin status table indicates (832) which plugin versions are designated for use at each website.

As noted above, the first and second versions of the software plugin are (818) simultaneously operational for distinct groups of users of the production website 114. In some instances a user 102 who is designated (836) as a preview mode user requests a webpage 328 that is included (840) in the production website 114. The webpage 328 uses (834) the software plugin. The web server 110 receives (834) the request from the user 102, and provides (842) the user 102 with the webpage 328 customized by the second version of the software plugin 734 (i.e., the preview version). In some implementations, each respective user 102 of the production website 114 has (838) a respective set of user preferences, and designation as a preview-mode user is (838) one of the user preferences that is modifiable by the respective user.

In some instances, the same user 102 who received the webpage 328 customized by the second version of the software plugin 734 changes (844) his designation from a preview mode user to a non-preview-mode user. That change is received (844) by the web server 110 (or admin server 120), and the corresponding user preference 326 is updated (846). When the web server 110 receives (848) a subsequent request for the webpage 328 from the user 102, the web server 110 provides (850) the webpage 328 customized by the first version of the software plugin. Switching between being a preview mode user and a non-preview mode user can be useful for testing the second version of the software plugin (e.g., to make sure that the second version works and to make sure that the intended differences between the first and second versions are implemented).

In some implementations, designation as a preview mode user is controlled by an admin user 104. In some implementations, all users are non preview-mode users by default, and are only designated as preview-mode users on an individual basis (e.g., by inclusion on a preview mode user list). In particular, designations as a preview mode user may be stored in an individual user's profile or in a separate table (or both). In some instances, a user is designated as a preview mode user, and receives the webpage 328 customized by the second version of the software plugin because of designation as a preview mode user as illustrated above. Later, the web server receives input to designate the user as a non-preview-mode user (e.g., to remove the user from the preview mode user list). When the web server receives a subsequent request for the webpage 328 from the user the web server provides the webpage 328 customized by the first version of the software plugin 734.

Although a plugin 734 may remain in a preview mode for an unlimited time, the span of time in preview mode is generally not protracted (e.g., one day or one week). During that time, a user's designation as a preview mode user or not can change many times. Each time a user requests a webpage 328 customized by a software plugin 734, the user's current mode is identified so that the proper plugin version is used.

In some instances, the web server 110 receives (852) a request from a fourth user for the webpage 328, where the fourth user is not designated (854) as a preview mode user. In such an instance, the web server 110 provides (856) the fourth user with the webpage 328 customized by the first version of the software plugin 734.

In general, the plugin deployment module 424 eventually receives (858) a request to designate the second version of the software plugin 734 as the live version. As noted above, the second version does not become the live version until the plugin deployment module 424 receives (860) authorization to implement the designation. At that time, the plugin deployment module 424 designates (862) the second version of the software plugin 734 as the live version. When the web server 110 receives (864) any subsequent request for the webpage from a user 102, the web server 110 provides the webpage 328 customized by the second version of the software plugin 734 regardless of whether the fifth user is designated as a preview-mode user.

In some cases, after a plugin 734 is deployed as the live version at the production site 114, a problem (or potential problem) with the plugin 734 is discovered. If the problem is significant, it may be desirable to roll back to the previous version of the software plugin. (What is deemed "significant" can depend on many factors.) A decision to roll back or not is determined by an authorized admin user 104. In some implementations, a rollback operation always reverts back to the immediately previous live version, and the immediately previous live version becomes the preview version as well. Other implementations provide more flexible rollback operations, allowing an admin user to: roll back just the live version while leaving the problematic version still accessible to preview users (e.g., to further investigate the problem, but not subjecting most users to the problem); or rolling back two or more versions. Note that rollback will always go back to a previously deployed live version. In practice, not all versions reach a live state in production (e.g., due to bugs caught at an earlier stage), and thus a rollback to the previous live version is not necessarily a rollback to a version number 1 less than the current live version (e.g., if the current live version is 58 and the previous live version was 55, then a simple rollback would reset version 55 as the live version).

In some instances, the plugin deployment module 424 receives (868) a request to rollback the second version of the software plugin 734. In some implementations, when a request to rollback is received from an authorized admin user 104, the deployment module 424 immediately designates (870) the first version of the software plugin 734 as the live version. In some implementations, a rollback is received as a request from one user 104, which must be authorized by another user 104 (although the two users may be the same person). In some implementations, when a subsequent request for the webpage 328 is received (872) from a user 102, the web server 110 provides (874) the webpage 328 customized by the first version of the software plugin 734 regardless of whether the user 102 is designated as a preview-mode user. In some implementations, the rollback operation only rolled back the live version, and thus the second version of the software plugin is still the version that will be used for users who are designated as preview mode users.

The figures illustrate many of the features of the disclosed invention, but there are many other variations and expansions. Although the above disclosure is based on a website for a single business entity, a single implementation can support multiple websites for distinct business entities. For example, the core platform code can provide the basic structure for an online community with forums, knowledge base articles, and so on. The core platform defines the specific plugin points where the basic website can be customized by various business entities. In some implementations, there are separate file server directories for each business entity, and further subdirectories for each plugin point. The core platform uses the appropriate plugins for each business entity. In implementations that store certain plugin information in a database (e.g., an SQL database), the data structures include a business entity code as a field (e.g., including a business entity code in each of the data structures in FIGS. 7A-7G). In this way, websites for multiple business entities can be hosted at a single physical site.

As noted previously, the core platform defines the plugin points, and a business entity is not required to create a plugin for each of the plugin points. Implementations can indicate the absence of a plugin in various ways. In some implementations, plugins are stored in a simple directory structure. In some implementations, the core code looks for a plugin in the appropriate directory to determine if there is a plugin to execute. In some implementations, each plugin point has a prebuilt set of default plugins that perform no custom operations.

In implementations that store plugins in a database, one of skill in the art recognizes that there are many ways to indicate the lack of a custom plugin. In some implementations, the lack of a custom plugin can be indicated by the absence of a record in a table, such as designated plugins table 334. (Note that the designated plugins table 334 can be normalized.) In some implementations, a NULL value for the version in a designated plugins table 334 indicates that there is no custom plugin. In some implementations, a designated plugins table 334 includes an effective date field so that the appropriate plugin (or absence of one) can be looked up by date.

The implementations described above for deploying plugins work best when the plugin points are independent. For code platforms that have dependencies between plugin points, some implementations support linked plugin deployment. In a linked deployment scenario, two or more plugins are linked together as part of a single deployment, and are moved together. To support this, some implementations split the data in the plugin deployment table 428 into two separate tables: the main plugin deployment table 428 has a single record for each deployment, specifies the source site 764 and destination site 766 (as well as intermediate sites 768, if any), but uses a separate child table (not illustrated) to identify each of the plugins that are part of the deployment.

The deployments previously identified move a plugin from one website to another, but one of skill in the art recognizes that the source of the plugin need not be a website. For example, the code and other components for a plugin may be stored in a version control system. During a development cycle, developers check out code or other components, and check in the components periodically. After testing and saving, the components for the plugin may be retrieved from the version control system to move to another website. Some implementations interface with version control systems so that the components of a plugin are copied directly from the version control system to the new website. Some implementations store plugin components in a simple directory structure that is not part of a website or a version control system, and the deployment module 424 accesses the plugin files from that directory structure.

In the implementation of FIG. 1, the staging website 108 and production website 114 share the same content database 122. This can facilitate testing in an environment that matches production, but could present a risk that production data is modified during testing. In some implementations, this problem is avoided by having separate content databases 122 for each website. For example, the content database used for staging can be refreshed by the production content database. In some instances, a staging or QA website only needs a small portion of the data in order to test the functionality effectively, so it may not be a substantial burden. In some implementations, the content database is set as read-only when accessed from the staging website 108, which prevents accidentally modifying production data.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of managing customization upgrades to a production website, performed by one or more servers, each having one or more processors and memory, the method comprising:
   receiving a request from a first user to copy a second version of a software plugin from a staging website to a production website, wherein the production website currently utilizes a first version of the software plugin, and the software plugin is used to customize a webpage at the production site;
   receiving authorization from a second user to implement the first user's request, and subsequently copying the second version of the software plugin to the production website without overwriting the first version of the software plugin, thereby making both the first and second versions of the software plugin simultaneously current versions of the software plugin for the production website, providing a first requester of the webpage with a second webpage version customized by the second version of the software plugin when the first requester is designated as a preview mode user and providing the first requester with a first webpage version customized by the first version of the software plugin when the first requester is not designated as a preview mode user;
   receiving a request to designate the second version of the software plugin as a live version, and receiving authorization to implement the designation;
   in accordance with the designation request, designating the second version of the software plugin as the live version; and
   receiving a subsequent request for the webpage from a second requester, and providing the webpage customized by the second version of the software plugin to the second requester regardless of whether the second requester is designated as a preview mode user.

2. The method of claim 1, further comprising:
receiving a request to rollback the second version of the software plugin;
in accordance with the rollback request, designating the first version of the software plugin as the live version; and
receiving a subsequent request for the webpage from a third requester, and providing the webpage customized by the first version of the software plugin to the third requester regardless of whether the third requester is designated as a preview mode user.

3. The method of claim 1, further comprising prior to designating the second version of the software plugin as the live version:
receiving input from the first requester to change the first requester's designation as a preview mode user, and updating a user preference of the first requester accordingly;
receiving a subsequent request for the webpage from the first requester; and
in response to the subsequent request from the first requester for the webpage:
providing the first requester with the webpage customized by the second version of the software plugin when the updated user preference of the first requester designates the first requester as a preview mode user; and
providing the first requester with the webpage customized by the first version of the software plugin when the updated user preference of the first requester does not designate the first requester as a preview mode user.

4. The method of claim 1, wherein the software plugin comprises a plurality of distinct components.

5. The method of claim 1, wherein the first user and the second user are distinct.

6. The method of claim 1, wherein each respective user of the website has a corresponding respective set of user preferences, and designation as a preview mode user is one of the user preferences that is modifiable by each respective user.

7. The method of claim 1, wherein copying the second version of the software plugin to the production website comprises:
copying the second version of the software plugin from the staging website to an intermediate website in accordance with first level authorization;
providing access to the webpage customized by the second version of the software plugin for users of the intermediate website; and
copying the second version of the software plugin from the intermediate website to the production website in accordance with second level authorization distinct from the first level authorization.

8. The method of claim 1, wherein the staging website and the production website both access software plugins from a single plugin repository, and wherein copying the second version of the software plugin to the production website comprises updating a plugin status table to specify that the second version of the software plugin is in a preview mode at the production website.

9. A computer server system providing access to a production website, comprising:
one or more processors;
memory; and
one or more programs stored in the memory, the one or more programs including instructions for:
receiving a request from a first user to copy a second version of a software plugin from a staging website to the production website, wherein the production website currently utilizes a first version of the software plugin, and the software plugin is used to customize a webpage at the production site;
receiving authorization from a second user to implement the first user's request, and subsequently copying the second version of the software plugin to the production website without overwriting the first version of the software plugin, thereby making both the first and second versions of the software plugin simultaneously current versions of the software plugin for the production website, providing a requester of the webpage with a second webpage version customized by the second version of the software plugin when the requester is designated as a preview mode user and providing the requester with a first webpage version customized by the first version of the software plugin when the requester is not designated as a preview mode user;
receiving a request to designate the second version of the software plugin as a live version, and receiving authorization to implement the designation;
in accordance with the designation request, designating the second version of the software plugin as the live version; and
receiving a subsequent request for the webpage from a second requester, and providing the webpage customized by the second version of the software plugin to the second requester regardless of whether the second requester is designated as a preview mode user.

10. The computer server system of claim 9, wherein the one or more programs further include instructions for:
receiving a request to rollback the second version of the software plugin;
in accordance with the rollback request, designating the first version of the software plugin as the live version; and
receiving a subsequent request for the webpage from a third requester, and providing the webpage customized by the first version of the software plugin to the third requester regardless of whether the third requester is designated as a preview mode user.

11. The computer server system of claim 9, wherein the one or more programs further include instructions that execute prior to designating the second version of the software plugin as the live version, for:
receiving input to change whether the first requester is designated as a preview-mode user;
receiving a subsequent request for the webpage from the first requester; and
responding to the subsequent request from a first requester for the webpage by:
providing the first requester with the webpage customized by the second version of the software plugin when the first requester is designated as a preview mode user; and
providing the first requester with the webpage customized by the first version of the software plugin when the first requester is not designated as a preview mode user.

12. The computer server system of claim 9, wherein the instructions for copying the second version of the software plugin to the production website comprise instructions for:
copying the second version of the software plugin from the staging website to an intermediate website in accordance with first level authorization;

providing access to the webpage customized by the second version of the software plugin for users of the intermediate website; and copying the second version of the software plugin from the intermediate website to the production website in accordance with second level authorization distinct from the first level authorization.

13. The computer server system of claim 9, wherein the staging website and the production website both access software plugins from a single plugin repository, and wherein the instructions for copying the second version of the software plugin to the production website include instructions for updating a plugin status table to specify that the second version of the software plugin is in a preview mode at the production website.

14. A non-transitory computer readable storage medium storing one or more programs configured for execution by a computer server system, the one or more programs comprising instructions for:

receiving a request from a first user to copy a second version of a software plugin from a staging website to the production website, wherein the production website currently utilizes a first version of the software plugin, and the software plugin is used to customize a webpage at the production site;

receiving authorization from a second user to implement the first user's request, and subsequently copying the second version of the software plugin to the production website without overwriting the first version of the software plugin, thereby making both the first and second versions of the software plugin simultaneously current versions of the software plugin for the production website, providing a requester of the webpage with a second webpage version customized by the second version of the software plugin when the requester is designated as a preview mode user and providing the requester with a first webpage version customized by the first version of the software plugin when the requester is not designated as a preview mode user;

receiving a request to designate the second version of the software plugin as a live version, and receiving authorization to implement the designation;

in accordance with the designation request, designating the second version of the software plugin as the live version; and receiving a subsequent request for the webpage from a second requester, and providing the webpage customized by the second version of the software plugin to the second requester regardless of whether the second requester is designated as a preview mode user.

15. The non-transitory computer readable storage medium of claim 14, wherein the one or more programs further comprise instructions for:

receiving a request to rollback the second version of the software plugin;

in accordance with the rollback request, designating the first version of the software plugin as the live version; and receiving a subsequent request for the webpage from a third requester, and providing the webpage customized by the first version of the software plugin to the third requester regardless of whether the first requester is designated as a preview mode user.

16. The non-transitory computer readable storage medium of claim 14, wherein the one or more programs further comprise instructions that execute prior to designating the second version of the software plugin as the live version, for:

receiving input to change whether the first requester is designated as a preview-mode user;

receiving a subsequent request for the webpage from the first requester; and responding to the subsequent request from a first requester for the webpage by:

providing the first requester with the webpage customized by the second version of the software plugin when the first requester is designated as a preview mode user; and providing the first requester with the webpage customized by the first version of the software plugin when the first requester is not designated as a preview mode user.

17. The non-transitory computer readable storage medium of claim 14, wherein the instructions for copying the second version of the software plugin to the production website comprise instructions for:

copying the second version of the software plugin from the staging website to an intermediate website in accordance with first level authorization;

providing access to the webpage customized by the second version of the software plugin for users of the intermediate website; and copying the second version of the software plugin from the intermediate website to the production website in accordance with second level authorization distinct from the first level authorization.

18. The non-transitory computer readable storage medium of claim 14, wherein the staging website and the production website both access software plugins from a single plugin repository, and wherein the instructions for copying the second version of the software plugin to the production website comprise instructions for updating a plugin status table to specify that the second version of the software plugin is in a preview mode at the production website.

* * * * *